June 30, 1964

S. P. HENRY ETAL 3,139,195

MATERIAL HANDLING APPARATUS

Filed Jan. 28, 1963

INVENTORS
Samuel P. Henry, &
Harold C. Kiess
BY
E.W.C.Christen
ATTORNEY

INVENTORS
Samuel P. Henry, &
Harold C. Kiess
BY
E.W. Christen
ATTORNEY

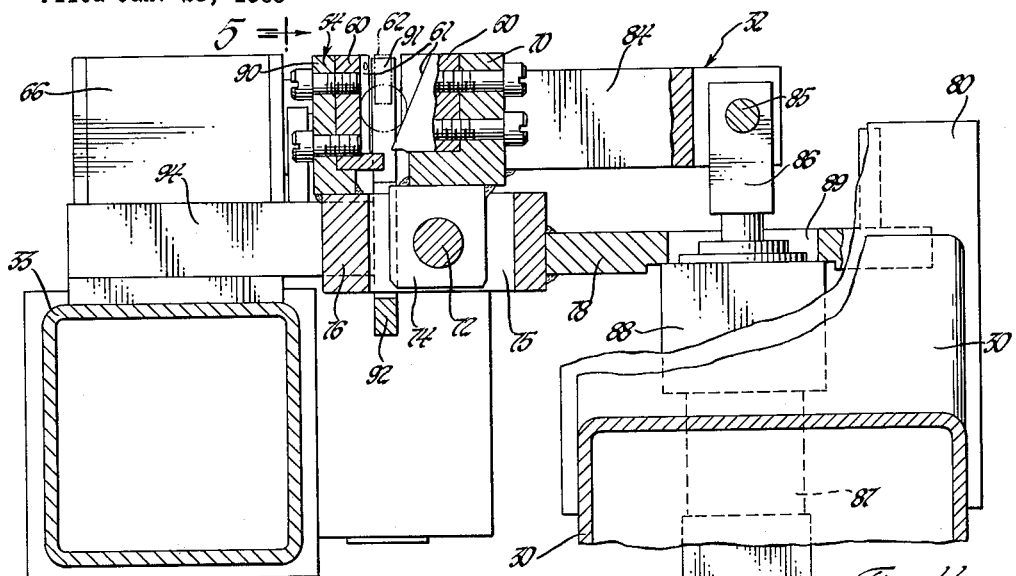
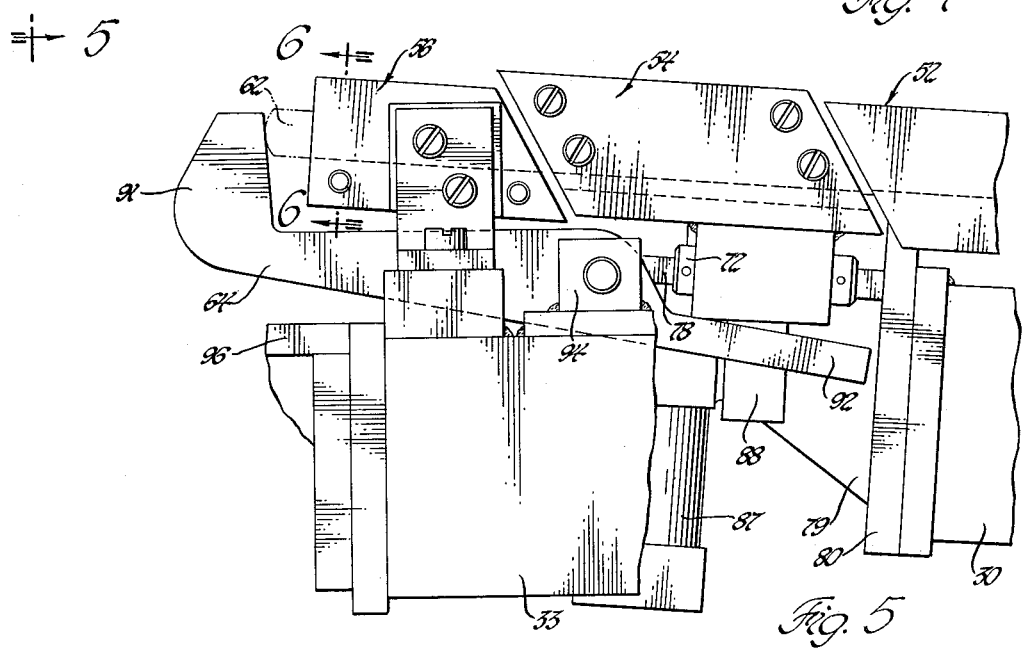
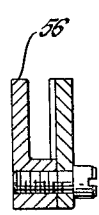 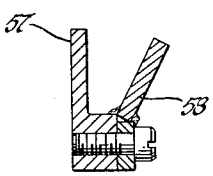 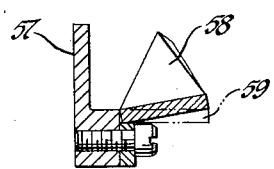
INVENTORS
Samuel P. Henry, &
Harold C. Kiess
BY
E.W. Christen
ATTORNEY

United States Patent Office 3,139,195
Patented June 30, 1964

3,139,195
MATERIAL HANDLING APPARATUS
Samuel P. Henry and Harold C. Kiess, Flint, Mich., assignors to General Motors Corporation, Detroit, Mich., a corporation of Delaware
Filed Jan. 28, 1963, Ser. No. 254,826
6 Claims. (Cl. 214—1)

This invention relates to a material handling apparatus, and more particularly to apparatus for orienting individual linear elements that are to be coiled into springs in a vehicle coil spring manufacturing process.

In the manufacture of vehicle coil suspension springs bar stock is cut to length and pre-shaped at the ends prior to the coiling operation. One end is normally flattened, tapering in such a fashion so that when the bar is coiled, that end will lie in a horizontal plane providing a flat spring seat against the vehicle frame. Prior to coiling, each bar is heated to a hot working temperature in a furnace, and from there advanced by transfer conveyor means to the vicinity of a spring coiling apparatus into which it is loaded then by hand, taking pains to see that the flattened end is perpendicular to the coiler's rotational axis.

It is a purpose of the present invention to eliminate the manual step of orienting the flattened end of a hot bar and for this purpose, a loading apparatus is provided having orientation means in the path of advance of the bar stock adapted to receive the flattened end thereof regardless of its orientation, the means acting on the flattened end to rotate the bar stock in the plane of advance so that the random orientation of the end is changed to a predetermined position, and transfer clamping means associated with the orientation means being operable to hold said end in the oriented position while transferring the bar from the orientation means.

Other purposes will appear by reference to the following description and drawings wherein:

FIGURE 4 is a cross-sectional view taken through the clamping assembly of the loading apparatus along the line 4—4 of FIGURE 3;

FIGURE 5 is an offset view showing a side elevation of the clamping assembly taken along the line 5—5 of FIGURE 4;

FIGURE 6 is a cross-sectional view of the front guide taken along the line 6—6 of FIGURE 5;

FIGURE 7 is a cross-sectional view near the end of the orientation channel taken along the line 7—7 in FIGURE 2; and FIGURE 8 is a cross-sectional view near the entrance of the orientation channel taken along the line 8—8 in FIGURE 2.

Figure 1:
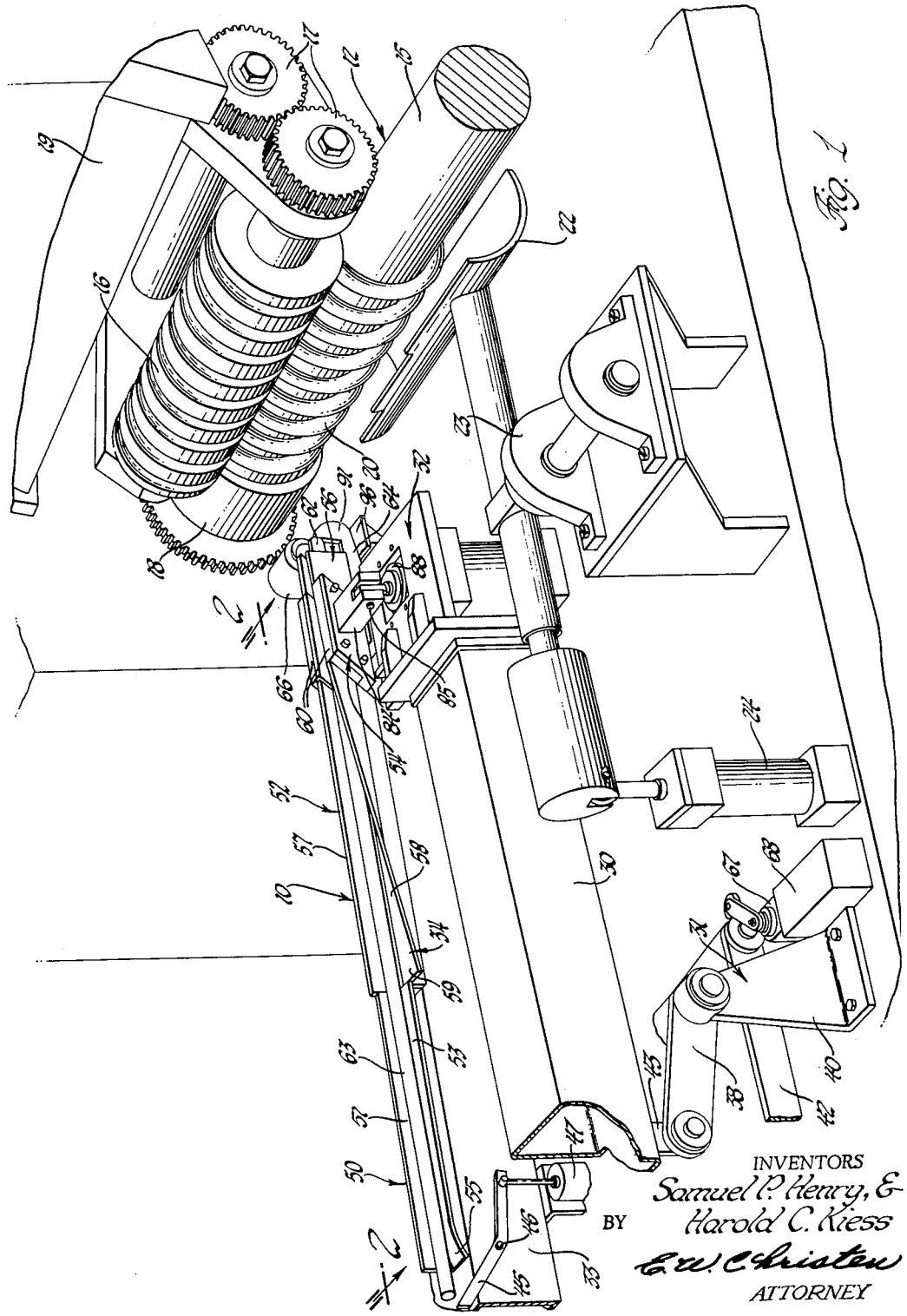
FIGURE 1 is a perspective view showing the inventive loading apparatus adjacent a spring coiling apparatus.

Referring to the drawings, in FIGURE 1, the inventive loader 10 is shown in the down position with respect to the spring coiler 12. The spring coiler 12 includes a mandrel 15 horizontally rotatable with respect to the helix roller 16. The helix roller 16 is driven by drive gears 17 and the mandrel 15 is driven from the driving head 18. An overhead mandrel retract cylinder 19 is connected to the mandrel 15 at the end opposite the driving head 18. A finished spring 20 is shown on the mandrel 15. When the spring 20 has been formed, the mandrel retract cylinder 19 is operated to axially withdraw the mandrel 15 from the drive head 18 and the helix roller 16, being engaged with the spring, acts to strip it from the mandrel; the spring then falls on the spring deflector blade 22 below. A spring deflector bearing block 23 supports the spring deflector blade 22 which may be pivoted downwardly in a vertical plane, being damped by shock absorber 24, to roll the finished coil spring on to a conveyor or the like.

Figure 2:
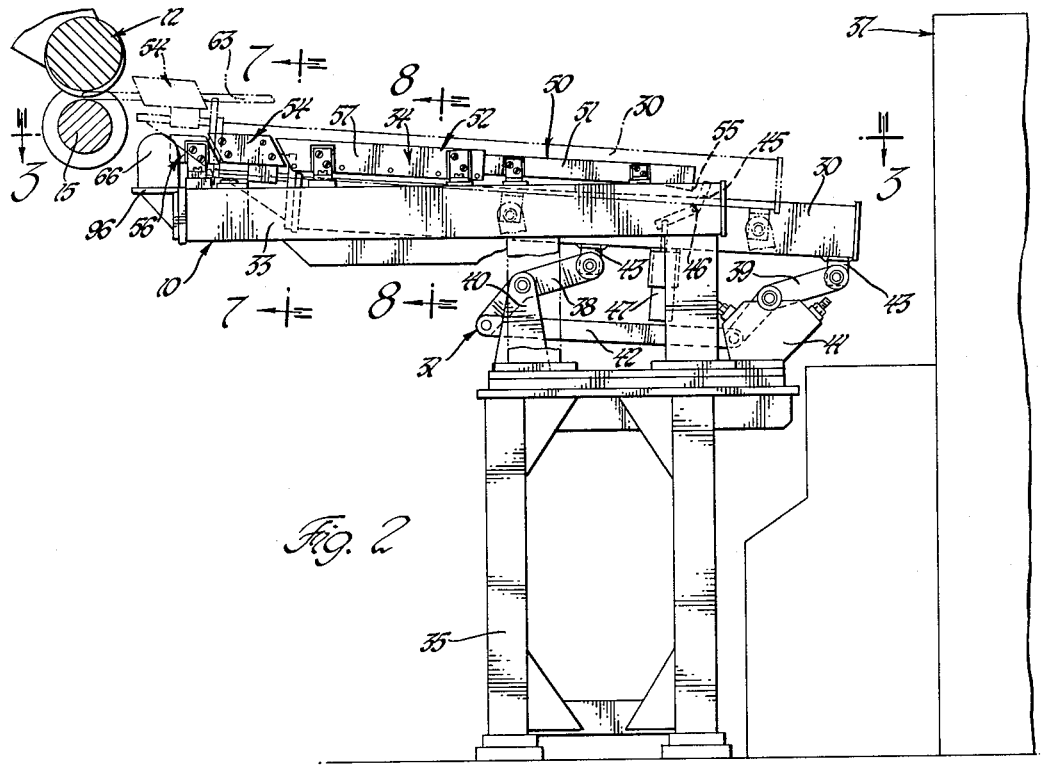
FIGURE 2 is a side view of the loading apparatus showing the raised and lowered positions.
Figure 3:
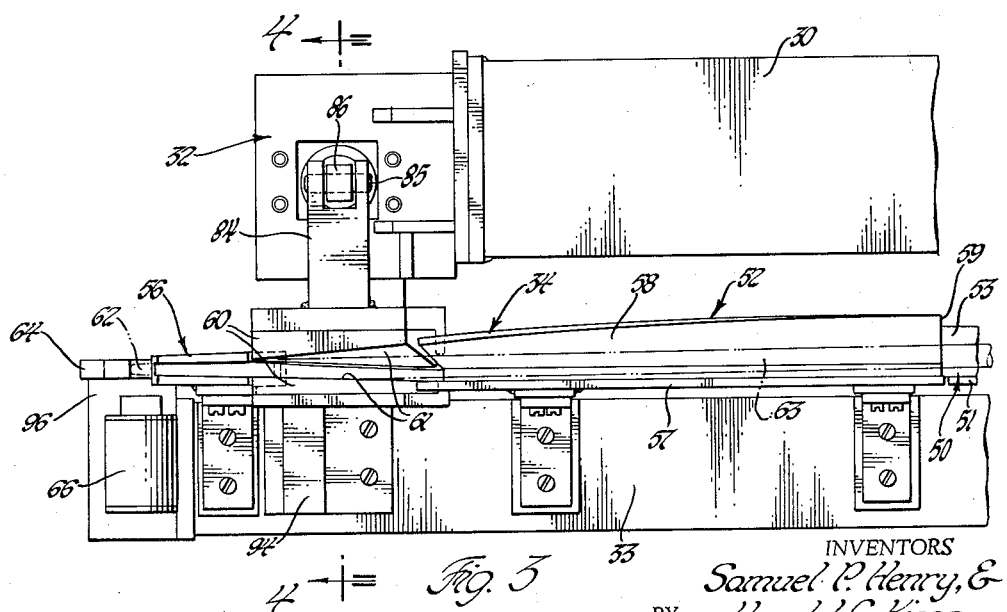
FIGURE 3 is a plan view of the apparatus taken along the line 3—3 of FIGURE 2.

The spring coiler 12 in no way forms a part of the present invention but is described so that the operation of the loading apparatus 10 may be better understood. The inventive loading apparatus 10 includes a movable beam 30 which is operated by a lift mechanism 31 and supports a clamping assembly 32. As best seen in FIGURE 2, a fixed beam 33 generally paralleling the movable beam 30, carries a positioning chute 34 and is mounted on stanchions 35 above the floor so as to be in the axis of advance of the hot bar stock emerging from the furnace 37. The lift mechanism 31 is mounted below the movable beam 30 and includes a pair of elbow links 38 and 39 pivoted to the stanchion 40 and the drive motor 41 respectively and connected at their lower ends to the transverse tie bar 42 and at their upper ends to ears 43 on the bottom of movable beam 30. The drive motor 41 powers the lift mechanism by pivoting the elbow link 39 forwardly, thus producing an upwardly and forwardly translation of movable beam 30; shown by the dot-dash lines in the fully raised position. A gate 45 is pivoted at 46 to the rear of fixed beam 33 and is operable by hydraulic cylinder 47 between the raised position shown, and a lowered position in which it is pivoted out of the way of the next bar advancing from the furnace 37. It should be understood that a conveyor or other transfer mechanisms (not shown) will exist to carry individual bars from the furnace along a single axis in alignment with the positioning chute 34. As seen in FIGURES 2 and 3, the positioning chute 34 includes a positioning chute extension 50, a channel section 52, clamping heads 54, and a front guide 56. The chute extension 50 has an L-shaped cross-section with a vertical wall 51 being joined by a horizontal wall 53. The horizontal wall 53 has an inclined threshold 55 at one end which is level with the end of the transfer mechanism carrying the bars from the furnace. The opposite end of extension 50 abuts the orientation channel section 52. Channel section 52 includes a vertical wall 57 having a laterally extending base to which is joined a spiraled turning blade 58 which is formed in twisted fashion from a horizontal plane at end 59 to nearly a vertical plane at the opposite end adjacent the clamping heads 54. The clamping heads 54 have inserts 60 provided with generated surfaces 61 which are a continuation of the surfaces of the orientation channel section 52. The front guide 56 has vertical walls which are angled to match the taper of the flattened end 62 of bar 63 and separated enough to permit the end 62 to project beyond against the stop 64. The axis of advance is along the longitudinal axis of the bar 63 shown by the dot-dash lines in position with the flattened end 62 against the bar stop 64.

An electronic heat or light sensor 66 is aimed between the bar stop 64 and the front guide 56. The sensor 66 may be the receiver portion of a conventional electric eye apparatus that is adapted to be energized when a glowing hot bar is positioned against the bar stop 64; or a commercially available heat sensor may be employed if desired. The receiver 66 initiates the lifting of movable beam 30 by causing the actuation of drive motor 41, simultaneously with the raising of gate 45 and the closing of clamping heads 54. A time delay mechanism, indicated at 67 in FIGURE 1, is reset by the elbow link 38 when beam 30 is in the down position and causes the actuation of microswitch 68 after a time lapse determined by the period required to fully raise movable beam 30. The actuation of microswitch 68 causes drive motor 41 to reverse, lowering the beam 30; and simultaneously release clamping head 54 and lower gate 45. A limit switch may, of course, be used instead of the electronic sensor, but we have found more positive initiation is achieved with the sensor.

As a hot bar proceeds along the axis of advance from the furnace 37, the flattened end 62 will first encounter the threshold 55 being guided along the extension 50 and assuming the end 62 is lying in a horizontal plane, it will proceed to ride up on the spiraled turning blade 58 of the orientation channel 52; and, as continued movement forces the bar along the channel 52, shown in cross-section in FIGURES 7 and 8, the bar will be rotated by the tilting action of the turning blade 58 on the flattened end 62. When the bar has moved along the axis of advance to near the end of the channel 52, the flattened end 62 will be nearly in a vertical position. From here on, the bar advances between the clamping heads 54 and the final rotation to a vertical position is provided by the generated turning surfaces 61 of the inserts 60 bringing the bar to rest with the end 62 in a vertical position between the walls of the front guide 56, shown in cross section in FIGURE 6. It will be clear from what follows that the oriented bar end must be perpendicular to the rotational axis of the coiler 12.

The gate 45 is shown in the raised position which is the case when movable beam 30 and clamp assembly 32 are moving to the fully raised position as shown by the dot-dash lines in FIGURE 2. The gate blocks the next bar from entering the positioning chute 34 until the spring coiler 12 has possession of the oriented bar, then the microswitch 68 is actuated to cause the gate 45 to lower simultaneously with the releasing of the clamping heads 54, and the reversing of drive motor 41 which begins returning the movable beam 30 and clamp assembly 32 to the lowered position ready to receive the next bar.

Referring to FIGURES 4 and 5, the clamping assembly 32 is mounted on the foremost end of the movable beam 30 and includes the clamping heads 54 including the movable clamping element 70 pivoted at 72 on boss 74 mounted in the opening 75 of the yoke 76 which projects laterally from the base 78. The base 78 is supported on the brace 79 from the end plate 80 secured on the end of movable beam 30. Actuating arm 84 is joined to the back side of the movable clamping element 70 and is pivotally connected at 85 to the rod link 86 operatively connected to the hydraulic cylinder 87 mounted on the bottom of the clamping assembly base 78 by mounting blocks 88 and below the opening 89 cut in the base 78. The fixed clamping element 90 is welded to the yoke 76 opposite the movable clamping element 70 and the inserts 60 are removable in case the turning surfaces 61 become worn. The bar stop 64 has a head 91 and a heel 92 and is pivotally mounted on the fixed beam 33 by the bearing block 94. The arm 92 projects axially along the side of fixed beam 33 below the laterally extending yoke 76. When the movable beam 30 is in the down position as shown in FIGURES 4 and 5, the stop is pivoted to the raised position with the head 91 in the path of advance of the bars; and when the movable beam 30 begins to raise, the yoke 76 is lifted off of the heel 92 and the stop pivots downwardly out of the way coming to rest on support 96 beneath the head 91.

The spring stock will have a previously flattened or tapered end 62 which, when coiled, will lie closely against the first full spring turn providing a substantially flat surface at the end of the coil spring 20 nearest the drive head 18 of the spring coiler 12, therefore it must be oriented perpendicularly with respect to the rotational axis of the coiler. In certain vehicle front suspensions a flat spring seat is provided on the vehicle frame, hence the end of the coil spring received in that seat must be flat for maximum support. The lower end of the spring is supported on the wishbone assembly of the front suspension in a spring pocket which doesn't necessarily require a flat spring surface. In operation, spring stock of bar lengths, for example, in the order of 96 or 181 inches, is heated to a hot working temperature in the furnace 37. A furnace conveyor mechanism, not shown, advances the spring stock through the furnace at a rate to insure that a hot temperature is reached. Individual bars are then dropped onto a transfer mechanism which feeds the bars separately to the loader 10 in alignment with the positioning chute 34. The speed of travel of the bars is adjusted so that movement into the positioning chute is not at a speed which would cause rebound when the end of the bar strikes the stop head 91. If a hot bar leaving the furnace has its flattened end lying in a horizontal plane, the flattened end will ride up on the spiraled blade 58 and as it advances, it will be rotated to a nearly vertical position, final positioning being left to the turning surfaces 61 and the front guide 56. In the event a bar end is already nearly in a vertical position, or at some angle other than horizontal, the degree of turning will be reduced.

With a hot bar resting against the stop head 91, the latent heat will be sufficient to emit radiant energy triggering the electric eye receiver 66 which initiates the actuation of the clamping cylinder 87 causing the movable clamping element 70 to pivot against the bar; the generated surfaces 61 gripping the tapered surfaces of the bar. The receiver 66 also causes simultaneous actuation of the drive motor 41 which operates the lift mechanism 31, and the cylinder 47 which moves the gate 45 into the raised position blocking entrance of the next bar. The oriented bar, clamped between heads 54, is moved forwardly and upwardly by the movable beam 30 and clamp assembly 32. When the bar is fully raised, as shown by the dot-dash lines in FIGURE 2, a spring coiler chuck (not shown) on mandrel 15 grips the end of the bar. Control of the loader is now shifted to the time delay mechanism 67 which triggers the microswitch 68 causing the actuation of cylinders 47 and 87 which retract the gate 45 and clamping heads 54; and simultaneously cause the reversing of drive motor 41 to begin lowering the movable beam 30. At this point, the bar is suspended between the spring coiler chuck at one end and the positioning chute extension 50 at the other. As the spring coiler winds the bar onto mandrel 15, the movable beam 30 is returned to its lowered position in advance of the next bar arriving at the clamp assembly 32, whereupon the operation is repeated.

Having now described the invention in detail with regard to the specific embodiments shown, it is not intended that it be limited specifically to a spring coiler loading apparatus, but that it should cover obvious modifications thereto well within the scope of the appended claims, as limited by the prior art.

We claim:
1. A material handling apparatus for a linear element advancing in one direction along a single axis and having a flattened end thereon preceding in the direction of advance being randomly oriented with respect thereto, said apparatus comprising;
   orientation means in the path of the axis advance being adapted to receive the flattened end regardless of its orientation, said means acting on the flattened end to rotate the element so that the random orientation of the end is changed to a predetermined oriented position; and
   transfer clamping means associated with the orientation means being operable to hold the element in the oriented position while moving it from the orientation means.

2. A material handling apparatus for linear elements advancing in one direction along a common axis and each having a flattened end thereon preceding in the direction of advance being randomly oriented with respect thereto, said apparatus comprising;

chute means located in the path of advance and adapted to sequentially receive each element regardless of the orientation of its flattened end, said chute means including, orientation means for acting on the flattened end to rotate the element received and change the random orientation of the end to a predetermined oriented position;

stop means positionable along the path of advance to limit the further advance of the element received;

transfer clamping means aligned with the chute means and being actuatable to a clamping position for holding the element received in the oriented position; and transfer means connected with the transfer clamping means being adapted for movement relative to the axis of advance for removing the oriented element from the chute means.

3. A material handling apparatus for linear elements advancing in one direction along a common axis and each having a flattened end thereon preceding in the direction of advance being randomly oriented with respect thereto, said apparatus comprising;

chute means located in the path of advance and adapted to sequentially receive each element regardless of the orientation of its flattened end, said chute means including aligned channel means having a spiraled wall for acting on the flattened end to rotate the element received and change the random orientation of the end to a predetermined oriented position;

stop means positionable in the path of advance to limit the further advance of the element received; and transfer clamping means aligned with the chute and channel means and forming a part of the chute means, said clamping means being actuatable to a clamping position for holding the element received in the oriented position; and transfer means connected with the transfer clamping means being adapted for upwardly and forwardly movement relative to the axis of advance for removing the oriented element from the chute means.

4. A material handling apparatus for pre-heated linear elements advancing in one direction along a common axis and each having a flattened end thereon preceding in the direction of advance being randomly oriented with respect thereto, said apparatus comprising;

chute means located in the plane of advance and adapted to sequentially receive each element regardless of the orientation of its flattened end, said chute means including aligned channel means having a spiraled wall for acting on the flattened end to rotate the element received and change the random orientation of the end to a predetermined oriented position;

stop means positionable in the path of advance to limit the further advance of the element received;

sensing means adjacent the stop means being responsive to radiant energy from the element emitted for detecting when it is engaged by the stop means; transfer clamping means aligned with the chute and channel means and forming a part of the chute means, said clamping means being actuatable in response to the sensing means to a clamped position for holding the element received in the oriented position; and transfer means connected with the transfer clamping means being actuatable in response to the sensing means for upwardly and forwardly movement relative to the axis of advance for removing the oriented element from the chute means.

5. A material handling apparatus according to claim 4 wherein the linear element received has a latent heat content sufficient to radiate light energy; and said sensing means comprising photoelectric means sensitive to the light energy emitted.

6. A material handling apparatus according to claim 4 wherein said wall comprises; a spiraled surface lying in a substantially horizontal plane at one end and in a substantially vertical plane at the other end whereby as the flattened end of the element received advances in the chute means it is rotated from a random orientation to a vertical position.

No references cited.